J. B. MENZL.
DRIP PAN FOR REFRIGERATORS.
APPLICATION FILED JAN. 28, 1911.
1,057,654.
Patented Apr. 1, 1913.
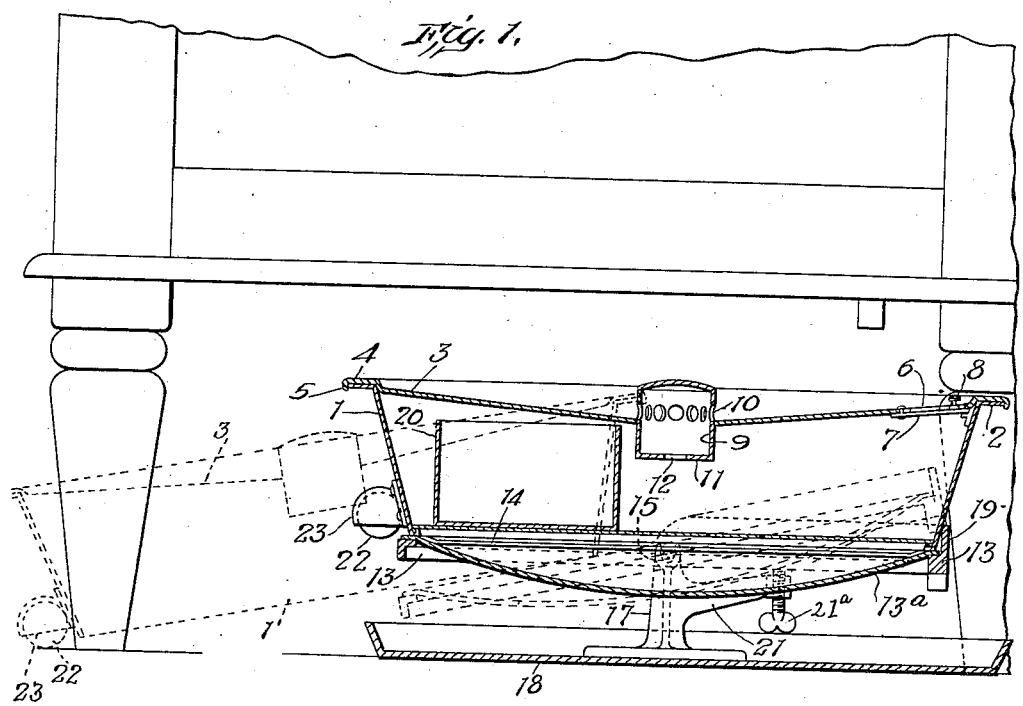
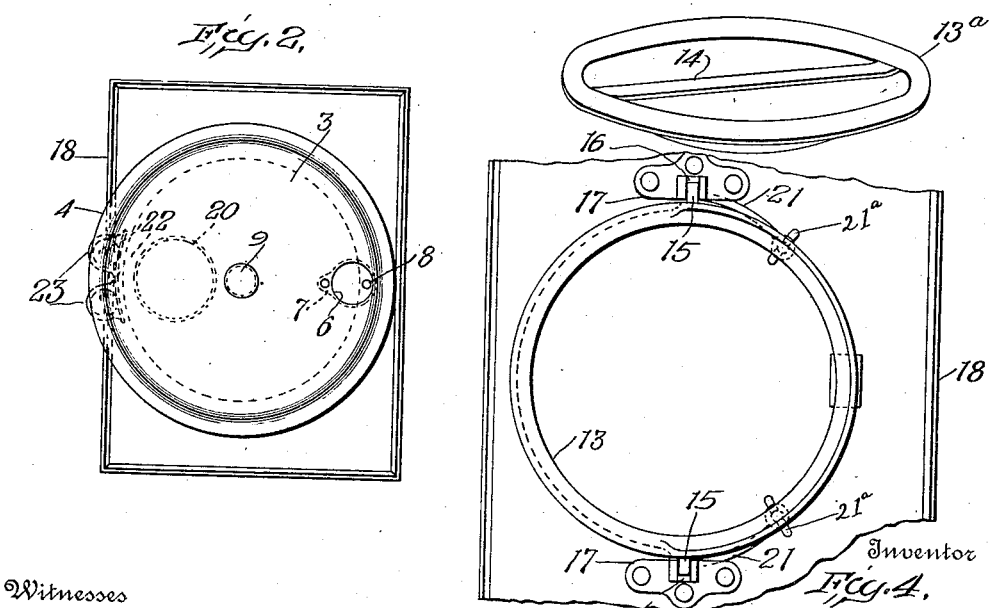
Witnesses
G. Howard Walmsley
Edward Reed
Inventor
John B. Menzl,
By H. A. Goodwin,
Attorney

UNITED STATES PATENT OFFICE.

JOHN B. MENZL, OF DAYTON, OHIO.

DRIP-PAN FOR REFRIGERATORS.

1,057,654.   Specification of Letters Patent.   Patented Apr. 1, 1913.

Application filed January 28, 1911. Serial No. 605,214.

*To all whom it may concern:*

Be it known that I, JOHN B. MENZL, a citizen of the United States, residing at Dayton, in the county of Montgomery and State of Ohio, have invented certain new and useful Improvements in Drip-Pans for Refrigerators, of which the following is a specification, reference being had therein to the accompanying drawings.

This invention relates to drip pans for refrigerators and the object of the invention is to provide a pan of this character which, when filled to the desired level, will be automatically moved into a position in which it will be visible to any person in the vicinity of the refrigerator and will bring to the notice of such person the necessity of emptying the same.

To accomplish this result it is a further object of the invention to mount the pan upon a tiltable support which is so balanced, when the pan is in position thereon, that it will maintain the pan in a substantially horizontal position until a predetermined amount of water has accumulated within the pan and will then be caused to move about its pivotal center and the pan caused to move relatively thereto.

It is also an object of the invention to provide means for conducting the drip from the refrigerator to the interior of the pan without causing the water to splash; and further, to provide a device of this character which will be simple in construction and certain in its operation.

In the accompanying drawings, Figure 1 is a vertical, sectional view of a drip pan embodying my invention, showing the same in position beneath a refrigerator; Fig. 2 is a top, plan view of the same; Fig. 3 is a detail perspective view of the removable plate forming a part of the tiltable support; and Fig. 4 is a top, plan view of the support with the plate removed.

In these drawings I have illustrated one embodiment of my invention and have shown the same as comprising a pan 1, preferably circular in shape and having at its upper edge an outwardly extending flange 2. The upper end of the pan is closed by a lid or closure 3 also having an outwardly extending portion 4 which is provided with a depending lip 5 and coöperates with the flange 2 to secure the lid 3 to the pan. The lid 3 has an opening 6 arranged near the edge thereof and adapted to permit the contents of the pan to be emptied without removing the lid. The opening 6 has a closure 7 arranged beneath the lid and preferably pivoted thereto. A knob 8 secured to the closure 7 extends through the opening and enables the closure to be moved out of alinement with the opening. The closure or lid 3 for the pan is preferably concave or dish-shaped to cause the water which may drip upon the same to flow toward the center thereof. The center of the lid has an opening in which is mounted a tube 9 having its upper and lower ends extending, respectively, above and below the lid. The upper end of the tube is closed and the wall thereof is provided with a series of apertures 10 arranged immediately above the lid 3 and adapted to permit the water to flow from the surface of the lid to the interior of the tube. The lower end of the tube has a closure 11 provided with a central opening 12 and constituting in effect an inwardly extending annular flange. It will be apparent, therefore, that the water dripping on the concave outer surface of the lid 3 will flow to the center thereof and pass through apertures 10 to the interior of the tube 9, thence downward along the inner wall of the tube and into engagement with the flange or bottom wall 11 and thence through the opening 12 to the interior of the drip pan. In this manner the fall of the water is broken and very little splashing is caused, and, if the water should splash to any extent it is not possible for it to escape from the pan.

The pan 1 is tiltably supported and is so arranged that it will be maintained in a horizontal position until the predetermined quantity of water has accumulated therein, this quantity being preferably sufficient to approximately fill the pan. When this quantity of water has accumulated in the pan it will be caused to tilt and will be projected either partially or wholly from beneath the refrigerator. I prefer to accomplish this result by movably mounting the pan on a pivoted supporting member of a suitable size and shape to support the pan and having its central portion depressed. In the form of the device here shown the support comprises a ring 13 having its central opening closed by a concave plate 13ª, the circumferential edge of which rests upon the ring 13 and, in the present instance, is interposed between the ring and the pan.

In the present form of the device the pan is slidably mounted on the support, and, to this end, a bar 14 is secured to the front and rear edges of the plate and bridges the concave central portion thereof. The tiltable support is preferably provided with laterally extending trunnions 15 which are rotatably mounted in bearings 16 carried by brackets 17 mounted upon a suitable base 18 which is here shown as comprising a shallow pan or receptacle. The axis of the trunnions 15 extends slightly in the rear of the center of the support, and, consequently, of the center of the pan when the latter is in position on the support. To maintain the support and the pan in a normally level position the rear edge of the support, that is, the edge lying on the same side of the center of the support with the axis thereof, is weighted to counterbalance the forward portions of the support and the pan. This may be done either by increasing the thickness of the material or by securing thereto suitable weights. In the present drawings both of these methods have been employed in securing the proper balance. Means are also provided for properly positioning the pan on the support and is here shown as comprising an upwardly extending flange 19 arranged about the edge of the support. This flange also adds to the weight of the rear portion of the support and assists in balancing the support and the pan.

If all portions of the pan were allowed to fill uniformly with water the weight of the forward portion of the pan would gradually overcome the weight added to the rear portion of the support, and, unless this weight was made very heavy, which is undesirable, the support would tilt before the pan was filled. I, therefore, so construct the pan that the water will be excluded from a portion thereof lying in front of the axis of the support until the remaining portions of the pan are substantially filled. This I preferably accomplish by arranging within the pan in front of the pivotal center thereof a cup-like chamber 20 having its upper edge spaced a short distance from the lid or closure 3. It will be apparent that the water is prevented from entering this chamber until it has risen to the level of the top thereof. By maintaining this portion of the pan empty the weight of the water in the rear portion of the pan will be greater than the weight of the water in the front portion of the pan, and, consequently, there will be no tendency of the pan to tilt forward and the rearweard movement of the support and the pan is limited by arms 21 extending rearwardly from the brackets 17. If desired, the arm may be provided with adjustable stops, such as the screws 21ª. When the water has reached the level of the upper edge of the cup-like receptacle or chamber 20 it will enter said receptacle and fill the same. As this chamber fills the weight of the water entering the same will so increase the weight of that portion of the pan in front of the axis of the support that when the chamber is substantially filled the pan and its support will be tilted forwardly and the pan will be discharged from the support. As soon as the pan tilts the water therein will rush toward the front wall thereof and thus expedite the movement of the pan relatively to the support, causing the same to be carried forward the desired distance. The forward edge of the pan is preferably provided with a rotary support to lessen the resistance to the forward movement of the pan, and, as here shown, this support consists of two spherical casters 22 mounted in sockets 23 carried by the pan. Such water as may drip from the refrigerator while the pan is in its forward position will drop upon the support and will be retained in the concave central portion thereof. If the pan should not entirely clear the support and should retain the same in a tilted position any material quantity of water which might drip onto the same would flow over the forward edge thereof and into the shallow receptacle 18 within which the brackets 17 are mounted. In either instance the water which would drip from the refrigerator at this time would be taken care of.

The operation of the device has been clearly described in connection with the description of the several parts thereof and it will be apparent that the device is very simple in its construction, comprising a minimum number of parts; that it is certain in its operation; and that the construction is such that when the pan is discharged the water will not be spilled and will not splash out of the pan when it drips from the refrigerator into the same.

I wish it to be understood that I do not desire to be limited to the details of construction shown and described, for obvious modifications will occur to a person skilled in the art.

Having thus fully described my invention, what I claim as new and desire to secure by Letters Patent, is:—

1. In a device of the character described, a drip pan, a tiltable supporting member for said drip pan having a part forming a slideway, and means to maintain said support normally in substantially a horizontal position and to tilt the same into a downwardly inclined position when a predetermined quantity of water has accumulated in said pan, thereby causing said pan to move upon said slideway.

2. In a device of the character described, a drip pan, a pivoted supporting member engaging the edges of the bottom of said pan in the front and in the rear of its pivotal center, means to maintain said support normally in a substantially horizontal position and to tilt the same to displace said pan when a predetermined quantity of water has accumulated within the pan, and a bar extending across said supporting member in the direction of movement of said pan and forming a slideway along which the rear edge of the pan moves.

3. In a device of the character described, a concave supporting member, trunnions secured to said supporting member on a line extending in the rear of the center thereof, bearing brackets to receive said trunnions, the rear portion of said supporting member being weighted to counterbalance the larger front portion thereof, arms carried by said bearing brackets to limit the downward movement of the rear portion of said supporting member, and a drip pan slidably mounted on said supporting member and having a chamber in that portion thereof in front of the line of said trunnions from which the water is excluded until a predetermined quantity has accumulated within the pan.

4. In a device of the character described, a receptacle forming a base, bearing brackets mounted in said receptacle, a supporting member having trunnions adapted to engage the bearings of said brackets and arranged in a line off the center of said support, a drip pan mounted on said support, and means for excluding the water from a portion of said pan in front of the line of said trunnions until a predetermined quantity of water has accumulated in the remaining portion of said pan.

5. In a device of the character described, a drip pan, a pivoted supporting member having its central portion depressed to form a receptacle, means controlled by the accumulation of the water in said pan to move said support about its pivotal center and cause said pan to move relatively thereto.

6. In a device of the character described, a drip pan, and a support therefor comprising an annular portion, means for pivotally supporting said annular portion of said support, and a concave plate closing the central opening of said annular portion of said support, and a bar extending across said concave plate.

In testimony whereof, I affix my signature in presence of two witnesses.

JOHN B. MENZL.

Witnesses:
J. FRED ANDERSON,
EDWARD S. REED.

Copies of this patent may be obtained for five cents each, by addressing the "Commissioner of Patents, Washington, D. C."